United States Patent [19]

Akita et al.

[11] 4,047,149
[45] Sept. 6, 1977

[54] BRAKE CHECKING SYSTEM
[75] Inventors: Sigeyuki Akita, Nukata; Junji Kitagawa, Okazaki, both of Japan
[73] Assignee: Nippon Soken, Inc., Nishio, Japan
[21] Appl. No.: 730,718
[22] Filed: Oct. 8, 1976
[30] Foreign Application Priority Data
Oct. 13, 1975 Japan ................................ 50-123661
[51] Int. Cl.² ............................................. B60T 17/22
[52] U.S. Cl. ................................ 340/52 B; 200/61.44
[58] Field of Search ..................... 340/52 A, 52 B, 69; 200/61.4, 61.41, 61.42, 61.44

[56] References Cited
U.S. PATENT DOCUMENTS
3,776,329  12/1973  Hope et al. ..................... 340/52 A X
3,808,593  4/1974   Kopernik et al. ................. 340/52 A Primary Examiner—Alvin H. Waring
Attorney, Agent, or Firm—Cushman, Darby & Cushman

[57] ABSTRACT

The inclusion of air into the brake system or the presence of a clearance between the brake shoes and the brake drums which is greater than a predetermined value is detected from the fact that the residual stroke of the brake pedal is increased each time the brake pedal of a vehicle is depressed. A brake sensor produces a frequency corresponding to the displacement of the brake pedal, and first and second displacement detecting circuits respectively detect the maximum displacement during first and second brake pedal movements. A comparison circuit compares the maximum displacements detected by the detecting circuits and produces a signal corresponding to the difference between the maximum displacements and a display circuit displays the signal from the comparison circuit to give a warning.

9 Claims, 11 Drawing Figures

BRAKE CHECKING SYSTEM

BACKGROUND OF THE INVENTION

1. Field of the Invention

The present invention relates to a brake checking system which compares the maximum distances of successive movements of the brake pedal of a vehicle to detect the inclusion of air into the brake system or the existence of an abnormal clearance or gap between the brake shoes and the brake drums.

2. Description of the Prior Art

In the past, it has been known that when the brake pedal of an automobile is rapidly depressed successively, if air has been drawn into the brake system or the clearance between the brake shoes and the brake drums is too large, the residual stroke of the pedal increases. The judgement of such operating conditions and operated positions of the brake pedal is relied on the experiments of the driver and consequently it is extremely difficult to discriminate the amount of the residual stroke of the pedal. Thus, it is also very difficult to detect the existence of any irregulalities in the brake system.

SUMMARY OF THE INVENTION

With a view to ovecoming the foregoing difficulty, it is the object of this invention to provide a brake checking system wherein the mechanical displacement of the brake pedal is converted into an electric displacement having a frequency variation corresponding to the mechanical displacement and the displacements by first and second maximum pedal movements are compared to detect and display whether the brake pedal stroke is proper or not.

DESCRIPTION OF THE PREFERRED EMBODIMENT

The present invention will now be described in greater detail with reference to the illustrated embodiment.

Figure 1:
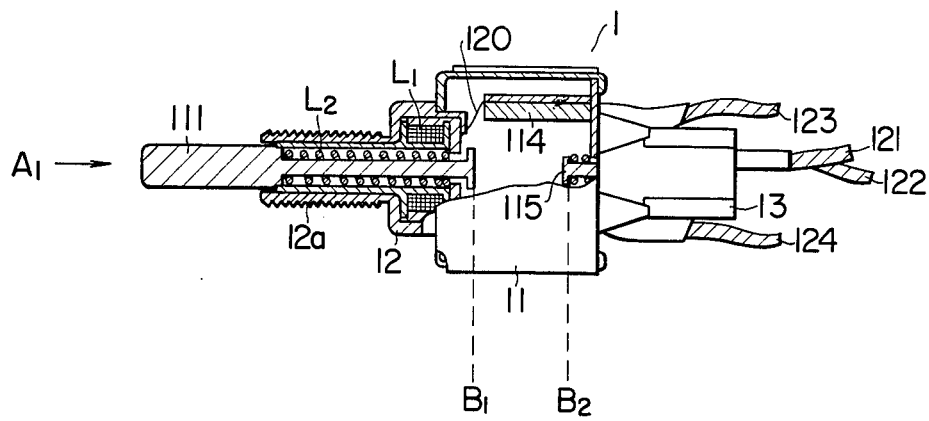
FIG. 1 is a sectional view showing the construction of a brake sensor used with a system of this invention, with a part thereof broken away.

A brake sensor 1 which senses the distance of a stroke of the brake pedal and converts it into an electric signal, will now be described with reference to FIGS. 1 to 5. In FIG. 1, numerals 11 and 12 designate housings, and the housing 12 which is made from a non-magnetic material has a threaded portion 12a for mounting it in place. Numeral 13 designates a contact unit incorporating contacts which are opened or closed in response to the movement of a switch 115, 111 a shaft of a non-magnetic material movable in response to the movement of the brake pedal and inserted into the housing 12, $L_2$ a spring coil serving to return the shaft 111 to a predetermined position and also serving the purpose of producing oscillations. Numeral 114 designates an electric circuit section comprising an oscillator circuit and a waveform shaping circuit, 120 an electric wire connecting the spring coil $L_2$, coil $L_1$ and electric circuit section 114 with one another, 121 and 122 output lines connected to the switch 115 for delivering its output signal, 123 a supply line, 124 an output line for delivering the output signal of the electric circuit section 114. The coil $L_1$ is fixedly held in place in the housing 12 and the spring coil $L_2$ is disposed to axially extend and retract in the central hollow portion of the coil $L_1$.

Figure 2:
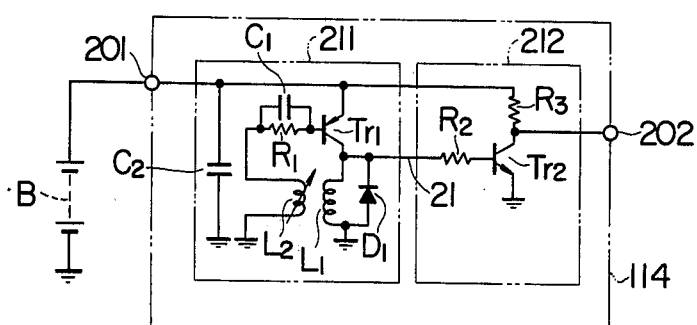
FIG. 2 is a wiring diagram of the electric circuit section incorporated in the brake sensor shown in FIG. 1.

In FIG. 2 showing the construction of the electric circuit section 114 mounted in the housing 11, symbol B designates a power source, an oscillator circuit 211 is comprised of a transistor $T_{r1}$, and resistor $R_1$, capacitors $C_1$ and $C_2$, the spring coil $L_2$, the coil $L_1$ and a diode $D_1$, and a waveform shaping circuit 212 is comprised of a transistor $T_{r2}$ and resistors $R_2$ and $R_3$. Numeral 201 designates a supply thermal connected to the supply line 123 shown in FIG. 1, 202 an output terminal connected to the output line 124 shown in FIG. 1. With this construction, the brake sensor 1 operates as follows. When the shaft 111 is pressed in the direction of an arrow $A_1$ in FIG. 1, the shaft 111 is moved within the housing 12 against the force of the spring coil $L_2$ so that when the shaft 111 is moved from its predetermined initial position or point $B_1$ to a point $B_2$, the switch 115 is urged by the shaft 111 and the contacts in the contact unit 13 are opened thus disconnecting the output lines 121 and 122, whereas when the force urging the shaft 111 in the direction of the arrow $A_1$ is removed, the shaft 111 is returned to the initial point $B_1$ and the contacts in the contact unit 13 are closed. This operation is the same with that of the known types of brake sensor.

Next, the operation of the brake sensor 1 for converting the displacement of the shaft 111 between the points $B_1$ and $B_2$ into a sequence of electric signals and delivering them from the output line 124 will be described. The general circuit operation of the oscillator circuit 211 shown in FIG. 2 will be described first with reference to FIGS. 3 and 4. In (A) of FIG. 3, when the potential at a point 301 of the transistor $T_{r1}$ is zero at a time $t_1$ as shown in (C) of FIG. 4, the transistor $T_{r1}$ is turned on and a current $i_1$ starts flowing in the primary coil $L_1$. Consequently, an electromotive force is induced in the secondary coil $L_2$ and the potential at the point 301 drops to a negative potential. Thus, when the current $i_1$ in the primary coil $L_1$ increases and saturates, the transistor $T_{r1}$ is turned off at a time $t_2$ by the charge in the capacitor $C_1$ as shown in (B) of FIG. 3. Consequently, the collector potential of the transistor $T_{r1}$ becomes zero at the time $t_2$ as shown in (D) of FIG. 4. When this occurs, the energy stored in the primary coil $L_1$ is discharged through the diode $D_1$ causing the flow of a current $i_2$. The resulting current waveform is shown in (E) of FIG. 4. This discharge current $i_2$ causes a back electromotive force in the secondary coil $L_2$ and it acts to eliminate the charge in the capacitor $C_1$. When the charge in the capacitor $C_1$ is dissipated at the expiration of a time period $T_1$, the transistor $T_{r1}$ is again turned on and the flow current $i_1$ is restarted thus repeating the same operation as mentioned previously.

Figure 4:
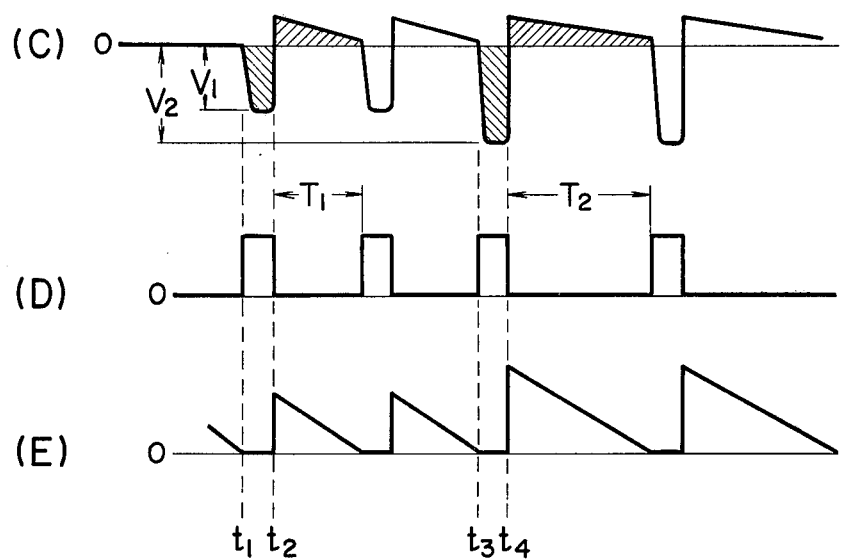
FIG. 4 is a signal waveform diagram useful in explaining the operation of the electric circuit shown in FIG. 3.

Then, when the number of turns of the secondary coil $L_2$ is increased or the degree of the inductive coupling between the primary and secondary coils $L_1$ and $L_2$ is increased, the transistor $T_{r1}$ is turned on at a time $t_3$ starting the flow of current $i_1$ and the base potential drops to a lower potential (the potential $V_2$ in (C) of FIG. 4) than the previously mentioned potential (the potential $V_1$ in (C) of FIG. 4) and a greater amount of charge is stored in the capacitor $C_1$ than in the previously mentioned case. Then, as the transistor $T_{r1}$ is turned off at a time $t_4$, while the flow of a discharge current or current $i_2$ occurs so that a back electromotive force is induced in the secondary coil $L_2$ and it acts to eliminate the charge in the capacitor $C_1$ in a like manner as mentioned previously, the capacitor $C_1$ now has the greater amount of stored charge and consequently the resulting off time $T_2$ of the transistor $T_{r1}$ becomes longer than the previous off time $T_1$. Namely, the oscillation frequency is decreased.

Figure 3:
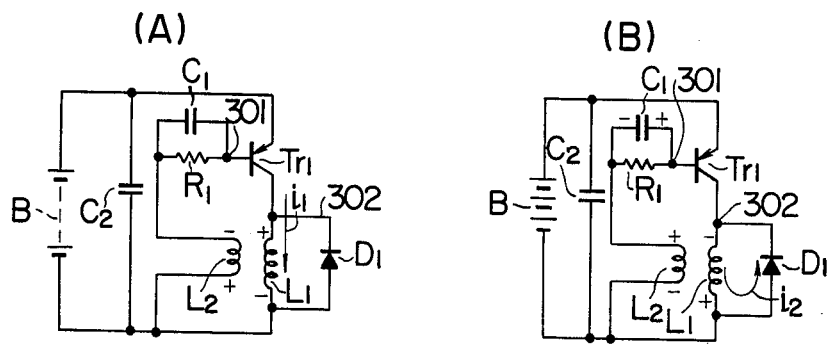
FIG. 3 illustrates wiring diagrams useful in explaining the basic operation of the brake sensor shown in FIG. 1.
Figure 5:
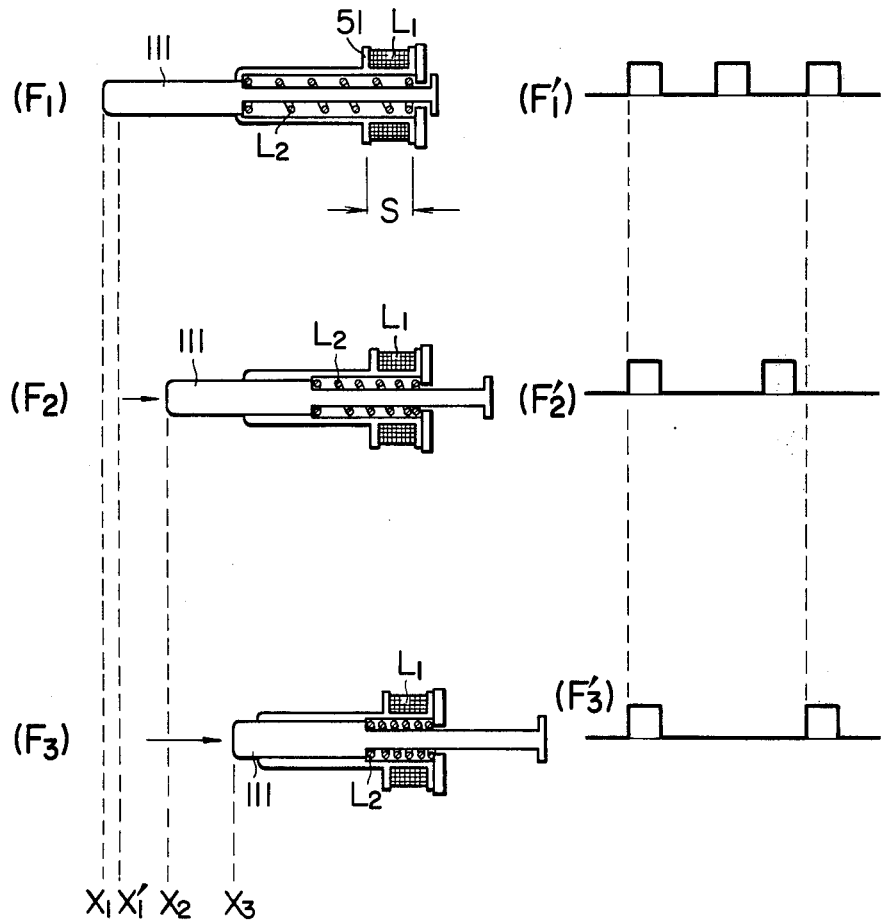
FIG. 5 illustrates the variations in the output signal of the brake sensor corresponding to the variations in the displacement of the brake pedal.

On the basis of the above-mentioned operation of the oscillator circuit 211, the variations of the oscillation frequency of the oscillator circuit 211 with the displacements of the shaft 111 in the brake sensor 1 will now be described with reference to FIG. 5. When the shaft 111 is at a position $X_1$ as shown in ($F_1$) of FIG. 5, that portion of the spring coil $L_2$ which serves as the secondary coil $L_2$ of FIG. 3 is represented by a length S (the axial length of the coil $L_1$) and the oscillator circuit 211 is oscillated by the portion of the spring coil $L_2$ corresponding to the length S and the coil $L_1$, thus producing the oscillation signals shown in ($F_1'$) of FIG. 5 on a line 21 shown in FIG. 2 (in this embodiment, the oscillation frequency is about 300 KHz). Then, when the shaft 111 is displaced in the direction of the arrow as shown in ($F_2$) of FIG. 5 so that the spring coil $L_2$ retracts and the shaft 111 is moved to a position $X_2$ thus increasing the number of turns of the coil spring $L_2$ in the portion S, as mentioned earlier, the degree of the inductive coupling between the coil $L_1$ and the spring coil $L_2$ is increased and the oscillation frequency is decreased as shown in ($F_2'$) of FIG. 5. When the shaft 111 is displaced further in the direction of the arrow as shown in ($F_3$) of FIG. 5 so that the spring coil $L_2$ retracts further and the shaft 111 is moved into a position $X_3$, the number of turns of the spring coil $L_2$ in the portion S increases further and the oscillation frequency is decreased further as shown in ($F_3'$) of FIG. 5. The oscillation signals of the brake sensor 1 whose frequency corresponds to the displacement of the shaft 111, are reshaped by the waveform shaping circuit 212 and delivered from the output line 124 of the brake chamber sensor 1.

Figure 6:
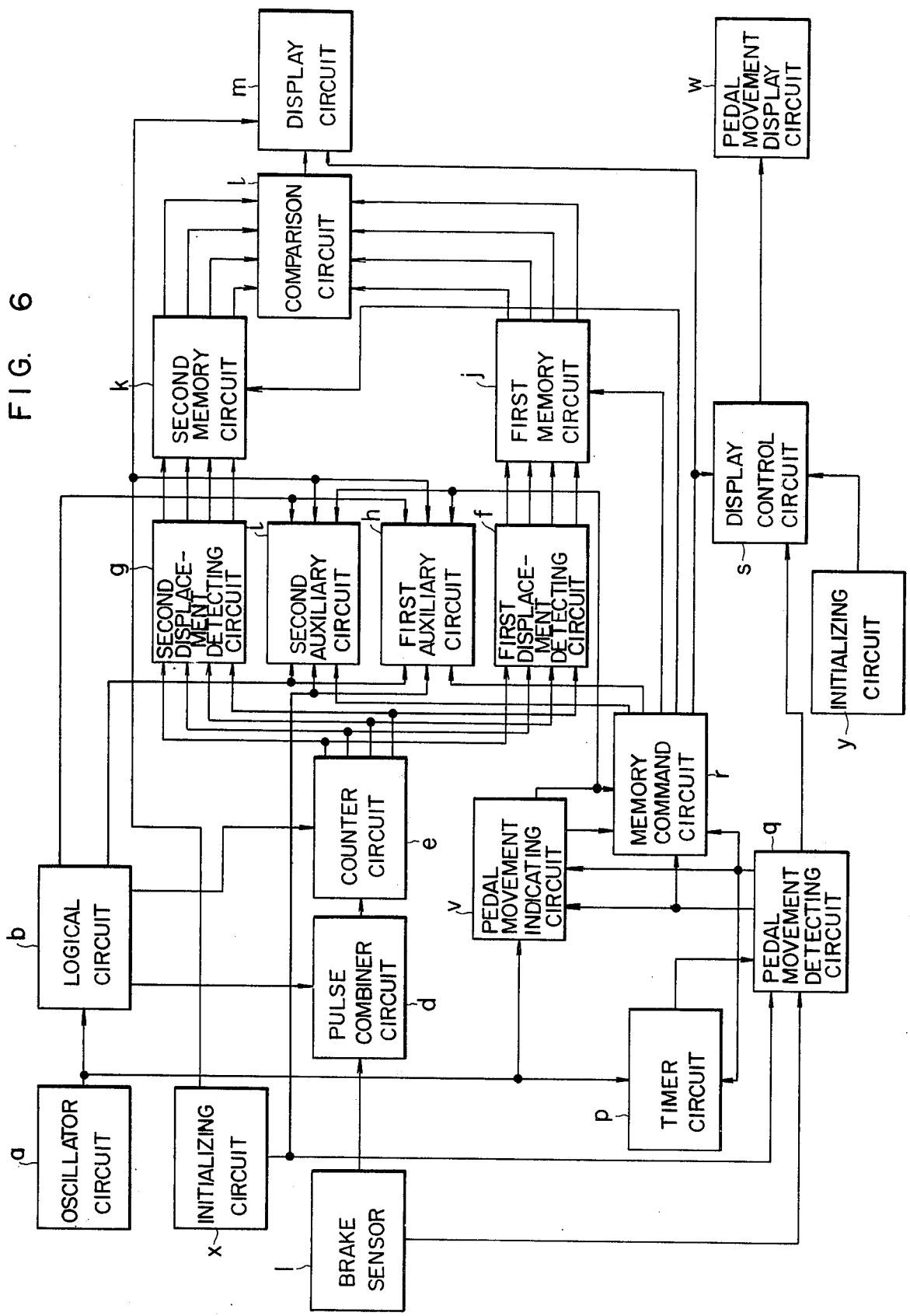
FIG. 6 is a block diagram showing a general construction of the check section in the system of this invention.

Next, the check section for checking the brake system for any irregularities in response to the output signals of the brake sensor 1 will be described. In FIG. 6, symbol $a$ designates an oscillator circuit for generating an output signal having a predetermined frequency, $b$ a logical circuit for generating signals to control the operation of other circuits, $d$ a pulse combiner circuit for producing composite pulse signals from the signals from the brake sensor 1 and the logical circuit $b$, $e$ a counter circuit for counting composite pulses, $f$ a first displacement detecting circuit for detecting the maximum pedal displacement produced by a first movement of the brake pedal in accordance with the count value of the counter circuit $e$, $g$ a second displacement detecting circuit for detecting the maximum pedal displacement produced by a second brake pedal movement. Symbols $h$ and $i$ respectively designate first and second auxiliary circuits which respectively assist the first and second displacement detecting circuits $f$ and $g$ in the detection of maximum pedal displacements, $j$ and $k$ first and second memory circuits for respectively storing the detected values of the first and second displacement detecting circuits $f$ and $g$, $l$ a comparison circuit for comparing the stored values of the first and second memory circuits $j$ and $k$, $m$ a display circuit for making a display corresponding to the comparison value of the comparison circuit $l$. Symbol $p$ designates a timer circuit for producing a timing signal having a predetermined time width $T_{01}$ following a first pedal movement, $q$ a pedal movement detecting circuit for detecting the occurrence of a second pedal movement within the predetermined time width $T_{01}$ after the first pedal movement, $r$ a memory command circuit for directing the memory operation of the first and second memory circuits $j$ and $k$, $s$ a display control circuit for controlling the operation of a pedal movement display circuit $w$, $v$ a pedal movement indicating circuit for giving an indication corresponding to the output value of the pedal movement detecting circuit $q$, $w$ the pedal movement display circuit for displaying the second movement of the brake pedal. Symbols $x$ and $y$ designate initializing circuits for restoring the various circuits to their initial states in response to the closing of the power circuit.

Figure 7:
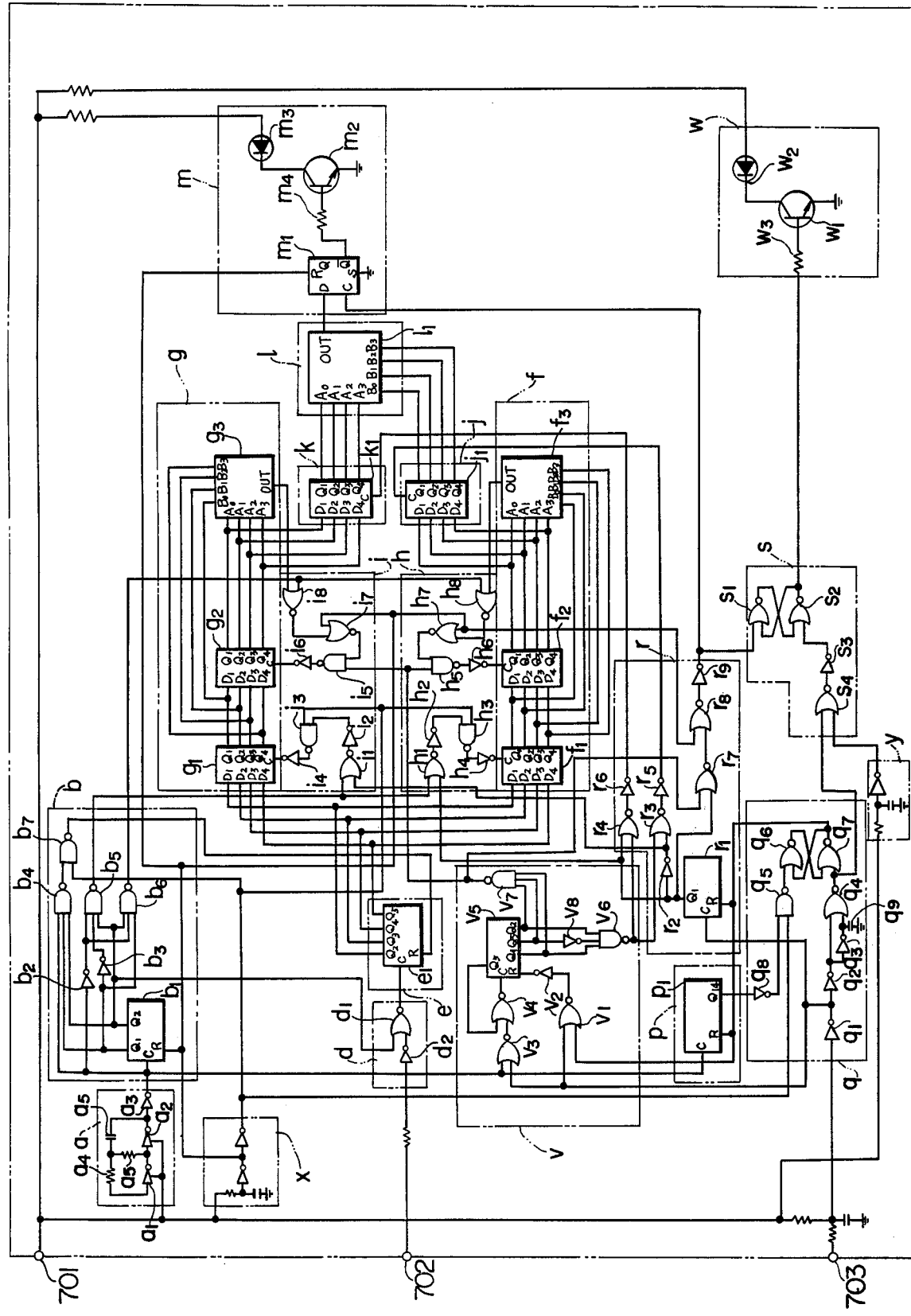
FIG. 7 is a wiring diagram showing a detailed construction of the check section shown in FIG. 6.

The detailed construction and operation of the individual circuits shown in FIG. 6 will now be described with reference to FIG. 7 and FIGS. 8 to 10, respectively. Referring first to FIG. 7, numeral 701 designates a supply terminal connected to the positive terminal of the power source B similarly as the terminal 201 shown in the previously described FIG. 2, 702 an input terminal connected to the output line 124 of the brake sensor 1 shown in FIG. 1 to receive the output signals thereof, 703 an input terminal connected to the output line 121 of the brake sensor 1 for receiving the on-off signals from the switch 115 of the brake sensor 1, and the output line 122 of the brake sensor 1 is connected to the grounded negative terminal of the power source B. Consequently, when the brake pedal is in the released position, the shaft 111 of the brake sensor 1 is at the point $B_2$ shown in FIG. 1 and thus the switch 115 is pressed opening the contacts in the contact unit 13. Thus, the signal level at the input terminal 703 of FIG. 7 goes to "1" (high level). On the contrary, when the brake pedal is depressed, at the instant that the shaft 111 of the brake sensor 1 separates from the switch 115, the contacts of the contact unit 13 are closed and the signal level at the input terminal 703 of FIG. 7 goes to "0" (low level).

The pedal movement detecting circuit $q$ comprises inverters $q_1$, $q_2$, $q_3$ and $q_8$, NOR gates $q_4$, $q_6$ and $q_7$, a NAND gate $q_5$ and a capacitor $q_9$. Now assuming that the brake pedal is depressed at the time $t_1$, the signal at the input terminal 703 goes to 0 as shown in (801) of FIG. 8 and the output of the inverter $q_1$ goes to "1" as shown in (802) of FIG. 8. Consequently, as shown in (803) of FIG. 8, the output of the NOR gate $q_4$ goes to 1 only at the time $t_1$ through the inverters $q_2$ and $q_3$, the NOR gate $q_4$ and the capacitor $q_9$. When the 1 signal is applied from the NOR gate $q_4$ to the set terminal of the R-S flip-flop comprising the NOR gates $q_6$ and $q_7$, the output of the NOR gate $q_7$ goes to 0 at the time $t_1$ as shown in (804) of FIG. 8. When this 0 signal arrives at the reset terminal R of a binary counter $p_1$ (the RCA IC CD4024) constituting the timer circuit $p$, the reset state of the binary counter $p_1$ is released and the counter $p_1$ starts counting the oscillator output signals applied to its input terminal C. These oscillation signals are produced by the oscillator circuit $a$ comprising inverters $a_1$, $a_2$ and $a_3$, resistors $a_4$ and $a_5$ and a capacitor $a_6$ and they are of a predetermined frequency. When the count value of the timer circuit $p$ or the binary counter $p_1$ reaches a predetermined value (e.g., 8,192) at the time $t_3$, its preselected output terminal (e.g., $Q_{14}$) goes to 1 so that the R-S flip-flop comprising the NOR gates $q_6$ and $q_7$ is reset and the output of the NOR gate $q_7$ to 1 at the time $t_3$ as shown in (804) of FIG. 8. Consequently, the binary counter $p_1$ is reset at the time $t_3$ and it stops counting the oscillation signals from the oscillator circuit $a$. Thus, the timer circuit $p$ produces a timing signal (0 signal) for the duration of the predetermined time period $T_{01}$ after the first movement of the brake pedal.

Figure 8:
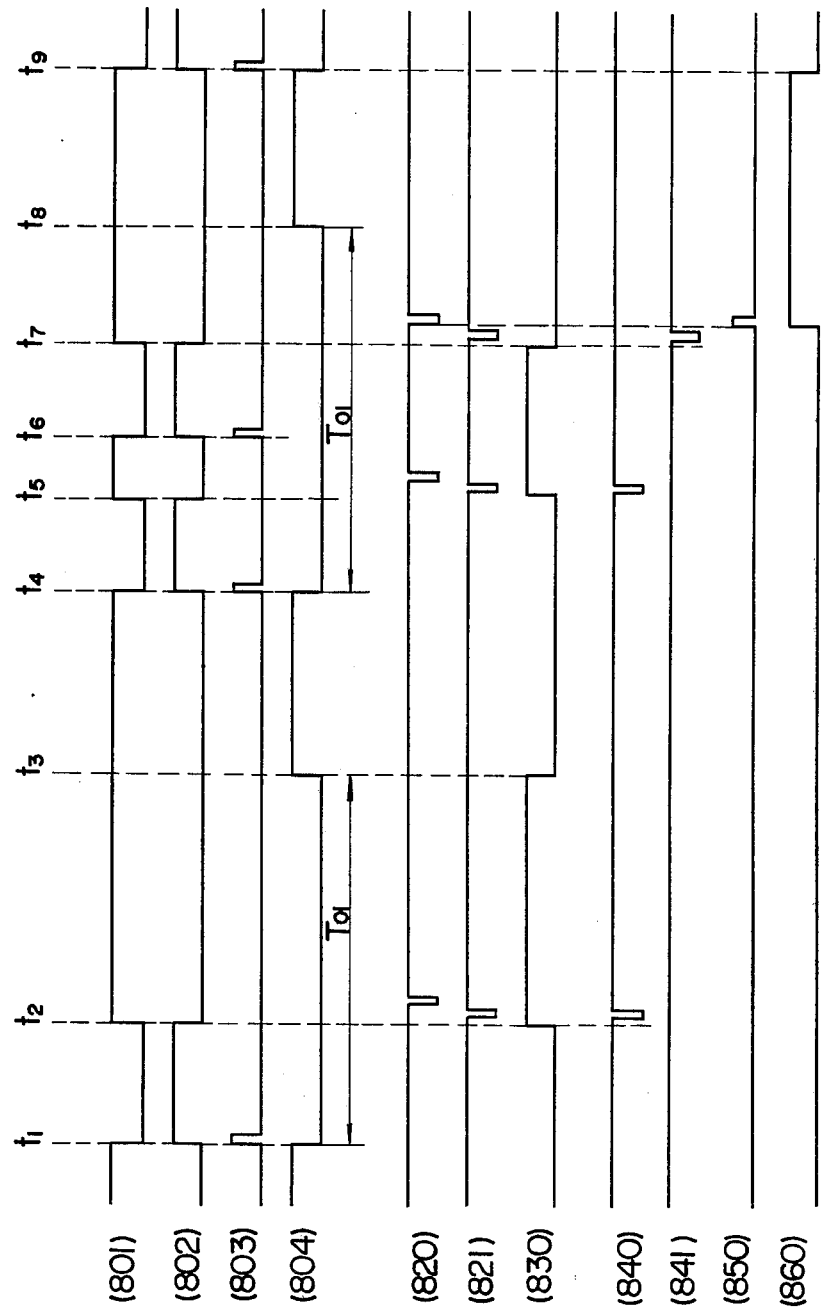
FIGS. 8, 9 and 10 are signal waveform diagrams useful in explaining the operation of the check section.
Figure 9:
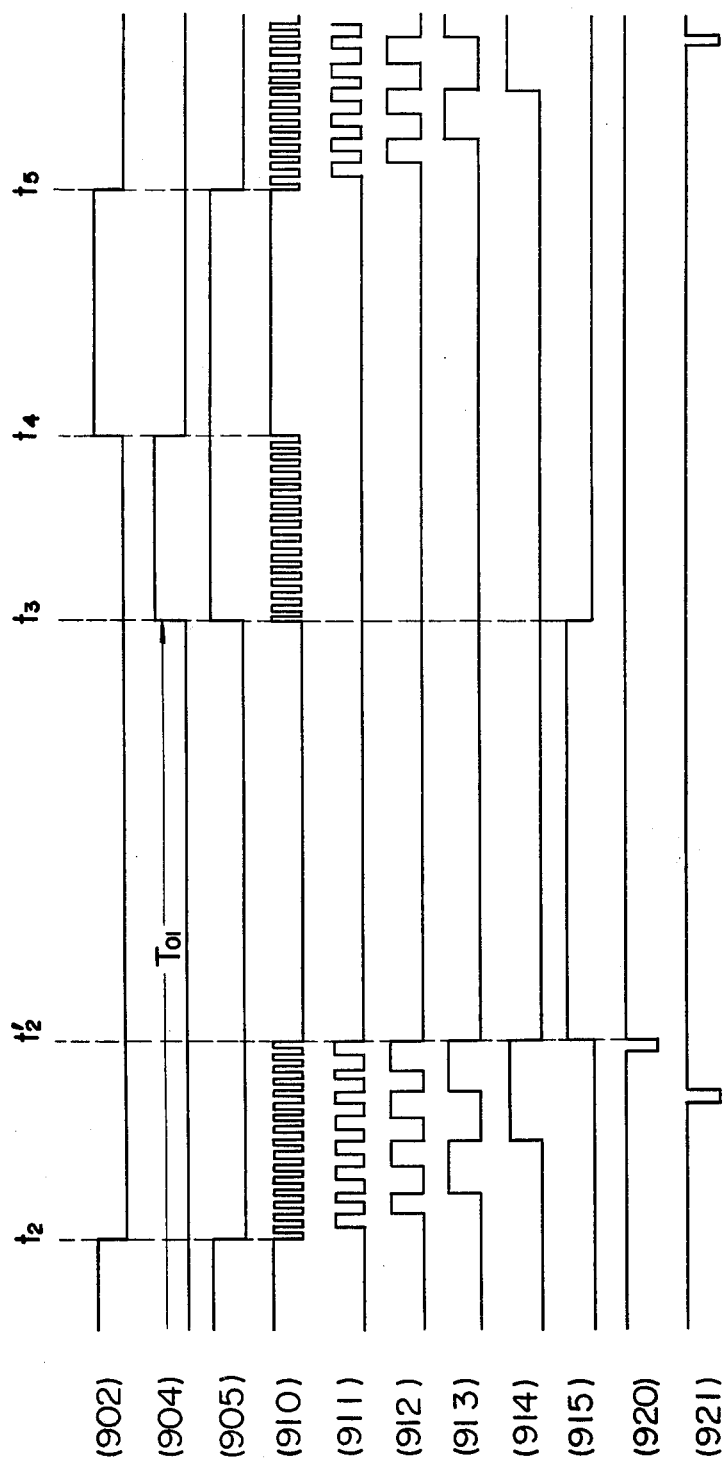

The pedal movement indication circuit $v$ comprises NOR gates $v_1$, $v_3$ and $v_4$, inverters $v_2$ and $v_8$, a binary counter $v_5$ and NAND gates $v_6$ and $v_7$, and the signals shown in (802) and (804) of FIG. 8 are applied to the NOR gate $v_1$. When the shaft 111 of the brake sensor 1 is separated from the brake sensor 1 at the time $t_2$, the signal at the input terminal 703 goes to 1 as shown in (801) of FIG. 8. Consequently, the output of the NOR gate $v_1$ goes to 1 at the time $t_2$ and the signal inverted by the inverter $v_2$ as shown in (905) of FIG. 9 is applied to the reset terminal R of the binary counter $v_5$. In FIG. 9, the time base is the same with that of FIG. 8 but on an enlarge scale and the signals shown in (902), (904), (920) and (921) of FIG. 9 are the same with those shown in (802), (804), (820) and (821) of FIG. 8. On the other hand, the signal shown in (902) of FIG. 9 and the oscillation signals of the oscillator circuit $a$ are applied to the NOR gate $v_3$ of the circuit $v$ and the NOR gate $v_4$ produces the oscillation signals from the time $t_2$ as shown in (910) of FIG. 9. These oscillation signals are counted by the binary counter $v_5$ and the frequency divided signals shown in (911), (912), (913), (914) and (915) of FIG. 9 respectively appear at its outputs $Q_1$, $Q_2$, $Q_3$, $Q_4$ and $Q_5$. Then, when the output $Q_5$ of the binary counter $v_5$ goes to 1 at a time $t_2'$, the NOR gate $v_4$ is closed and the respective outputs of the binary counter $v_5$ maintains the output states attained at the time $t_2'$. Then, at the expiration of the time period $T_{01}$ after the depression of the brake pedal at the time $t_1$, i.e., at the time $t_3$, the timing signal shown in (904) of FIG. 9 goes to 1 so that the output of the NOR gate $v_1$ goes to 0 and the 1 signal shown in (905) of FIG. 9 is applied to the reset terminal of the binary counter $v_5$ thus resetting the binary counter $v_5$. When this occurs, the output $Q_5$ of the binary counter $v_5$ goes to 0 and the NOR gate $v_4$ is opened thus applying the oscillation signals to the binary counter $v_5$. However, since the reset terminal R of the binary counter $v_5$ is then at 1 as shown in (905) of FIG. 9, its outputs $Q_1$, $Q_2$, $Q_3$, $Q_4$ and $Q_5$ are held in the initially set 0 state. Thereafter, if the brake pedal is again depressed at the time $t_4$ and released at the time $t_5$, the similar operation as the above-mentioned operation which occurred after the time $t_2$ takes place after the time $t_5$. The NAND gates $v_6$ and $v_7$ respectively perform a logical operation on the signals from the outputs $Q_2$, $Q_3$ and $Q_4$ of the binary counter $v_5$, so that the memory activation signal shown in (921) of FIG. 9 is produced at the output of the NAND gate $v_6$ and the memory reset signal shown in (920) of FIG. 9 is produced at the output of the NAND gate $v_7$. The memory reset signal and the memory activation signals are also shown respectively in (820) and (821) of FIG. 8.

The memory command circuit $r$ comprises a binary counter $r_1$, inverters $r_2$, $r_5$, $r_6$ and $r_9$ and NOR gates $r_3$, $r_4$, $r_7$ and $r_8$, and the signal shown in (802) of FIg. 8 and the timing signal shown in (804) of FIG. 8 are respectively applied to the input terminal C and the reset terminal R of the binary counter $r_1$. Thus, since the output $Q_1$ of the binary counter $r_1$ goes to 1 at the time $t_2$ as shown in (830) of FIG. 8, this $Q_1$ output goes back to the initial state or 0 at the time $t_3$. Thereafter, if the brake pedal is depressed at the time $t_4$, as mentioned previously, the timing signal shown in (804) of FIG. 8 goes to 0 and the timing signal goes to 1 at a time $t_8$ or at the expiration of the time period $T_{01}$ after the depression of the brake pedal at the time $t_4$. Assuming that the brake pedal operation is effected during this time period $T_{01}$ or the time period between the times $t_4$ and $t_8$, that is, the brake pedal is released at a time $t_5$, depressed again at a time $t_6$ and then released again at a time $t_7$, the output $Q_1$ of the binary counter $r_1$ goes to 1 at the time $t_5$ and it goes to 0 at the time $t_7$ as shown in (830) of FIG. 8. The NOR gates $r_3$ and $r_4$ respectively perform a logical operation on the signal from the output $Q_1$ of the binary counter $r_1$ which is shown in (830) of FIG. 8 or its inverted signal by the inverter $r_2$ and the previously mentioned signal shown in (821) of FIG. 8 and the resulting signals are respectively inverted by the inverters $r_5$ and $r_6$. Consequently, the first memory command signal shown in (840) of FIG. 8 appears at the output of the inverter $r_5$ and the second memory command signal shown in (841) of FIG. 8 appears at the output of the inverter $r_6$. Thus, the operation of depressing the brake pedal at a given time is called as a first movement and another operation of depressing the pedal again during the predetermined time period $T_{01}$ after the first pedal depression is called as a second movement. Consequently, if the brake pedal is depressed at a given time and the pedal is again depressed after the expiration of the time period $T_{01}$, the latter depression does not constitute a second movement, i.e., it constitutes a first movement and consequently the next depression of the brake pedal made during the time period $T_{01}$ following the first movement constitutes a second movement. In other words, in FIG. 8 the times $t_1$, $t_4$ and $t_9$ respectively represent the time of first movement and the time $t_6$ represents the time of second movement. Further, in the memory command circuit $r$, the output of the binary counter $r_1$ shown in (830) of FIG. 8 and the memory reset signal or the input of the NAND gate $v_7$ shown in (820) of FIG. 8 are applied to the inputs of the NOR gate $r_7$ which in turn produces at its output a second movement signal that goes to 1 during a time period $t_7$ to $t_8$ as shown in (850) of FIG. 8.

The display control circuit $s$ comprises NOR gates $s_1$, $s_2$ and $s_4$ and an inverter $s_3$, and the second movement signal shown in (850) of FIG. 8 is applied through the NOR gate $r_8$ and the inverter $r_9$ to the set terminal of the R-S flip-flop including the NOR gates $s_1$ and $s_2$. Since the signal shown in (803) of FIG. 8 which goes to 1 upon depression of the brake pedal is being applied to the reset terminal of the R-S flip-flop, the check display signal shown in (860) of FIG. 8 and which goes to 1 upon production of the second movement signal shown in (850) of FIG. 8 is produced at the output of the NOR gate $s_2$.

The pedal movement display circuit $w$ comprises a transistor $w_1$, a light emitting diode $w_2$ and a resistor $w_3$, and the check display signal is applied to the base of the transistor $w_1$ so that only when a second movement of the brake pedal is effected, the light emitting diode $w_2$ is lighted thus indicating that the second movement in the pedal operation has taken place. The initializing circuit $y$ sets the display control circuit $s$ in the initial state when the power source B is switched on.

Figure 10:
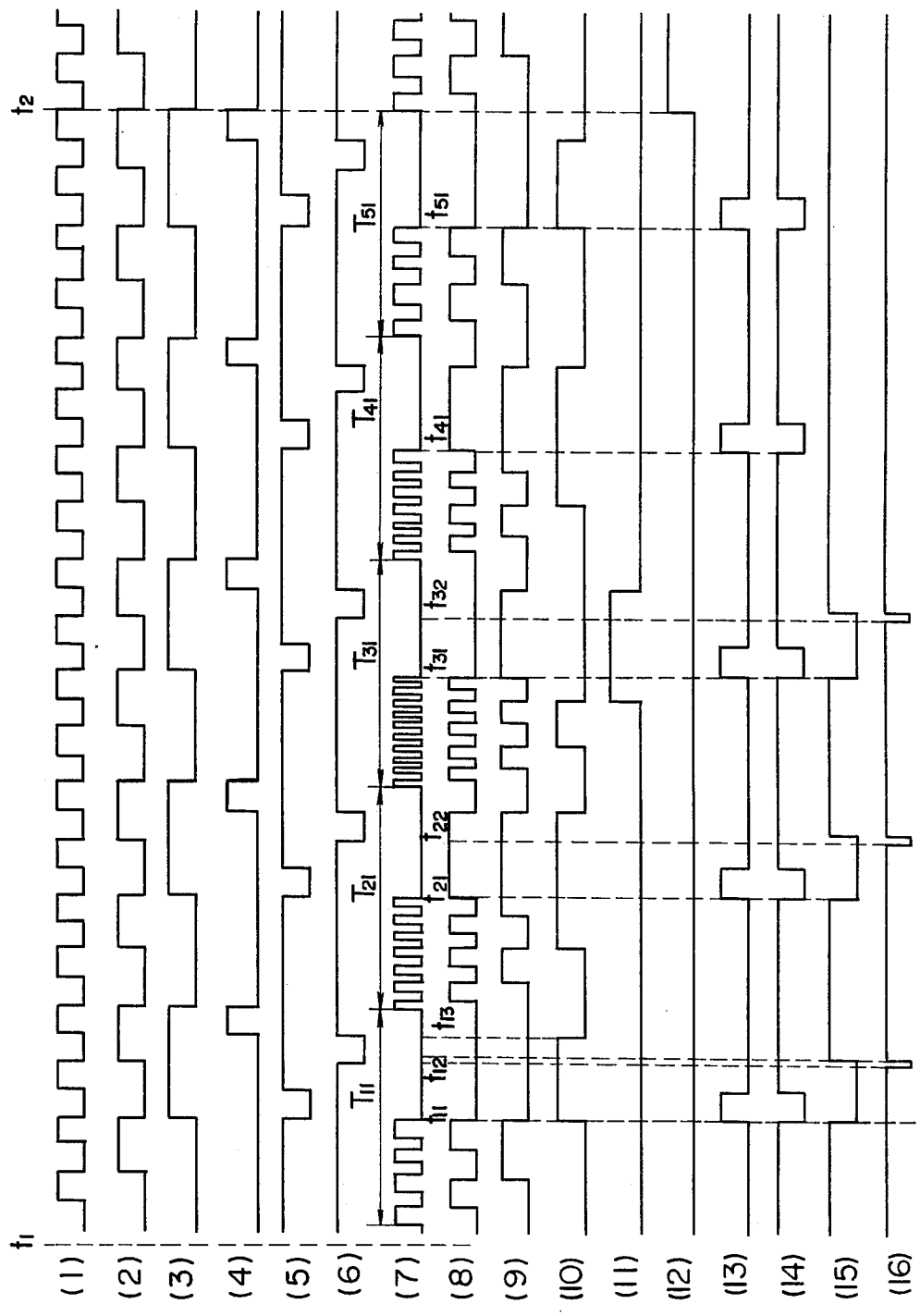

Next, the detection of the displacement of the brake pedal when it is depressed in the manner described above, namely, the displacement of the shaft 111 of the brake sensor 1 will be described. In FIG. 10, the time base of FIG. 8 is illustrated on an enlarged scale with the various signal waveforms generated during the time period between the times $t_1$ and $t_2$, and the oscillation signals from the oscillator circuit $a$ are shown in (1) of FIG. 10.

The logical circuit $b$ comprises a binary counter $b_1$, inverters $b_2$ and $b_3$ and NAND gates $b_4$, $b_5$, $b_6$ and $b_7$, and the oscillation signals from the oscillator circuit $a$ are applied to the input terminal C of the binary counter $b_1$ so that the signals shown respectively in (2) and (3) of FIG. 10 are respectively produced at the outputs $Q_1$ and $Q_2$ of the binary counter $b_1$ and these signals are subjected to logical operations by the inverters $b_2$ and $b_3$ and the NAND gate $b_4$, $b_5$, $b_6$ and $b_7$, thus producing at the output of the NAND gate $b_7$ the count reset signal shown in (4) of FIG. 10 and at the output of the NAND gate $b_6$ the signal shown in (6) of FIG. 10.

The pulse combiner circuit $d$ comprises a NOR gate $d_1$ and an inverter $d_2$, and the signal from the output $Q_2$ of the binary counter $b_1$ is applied to the NOR gate $d_1$. On the other hand, the output signal of the brake sensor 1 whose frequency varies in accordance with the displacement of the brake pedal is reshaped by the inverter $d_2$ and applied to the NOR gate $d_1$. Consequently, the composite pulse signals shown in (7) of FIG. 10 are produced at the output of the NOR gate $d_1$. In other words, in FIG. 10 a time period $T_{11}$ indicates the time that, after the depression of the brake pedal has been started at the time $t_1$ thus causing the shaft 111 of the brake sensor 1 to move, the displacement of the shaft 111 (hereinafter referred to as a pedal displacement) remains at the position $X_3$ as shown in $(F_3)$ of FIG. 5, at time period $T_{21}$ indicates the time that the displacement remains at the position $X_2$ shown in $(F_2)$ of FIG. 10 and a time period $T_{31}$ indicates the time that the displacement remains at the position $X_1$ shown in $(F_1)$ of FIG. 5. Here, it is assumed that the depression of the brake pedal results in the movement of the shaft 111 of the brake sensor 1 to the position $X_1$ as shown in $(F_1)$ of FIG. 5 when the brake system is functioning normally. Also a time period $T_{41}$ indicates the time that the pedal on its return stroke remains at the position $X_2$ and a time period $T_{51}$ indicates the time that the pedal remains at the position $X_3$.

The counter circuit $e$ comprises a binary counter $e_1$ and the binary counter $e_1$ counts the composite pulse signals from the pulse combiner circuit $d$ and produces its count at its outputs $Q_1$, $Q_2$, $Q_3$ and $Q_4$ in binary code form. In other words, the signals respectively shown in (8), (9), (10) and (11) of FIG. 10 are respectively produced at the outputs $Q_1$, $Q_2$, $Q_3$ and $Q_4$ of the binary counter $e_1$.

The first displacement detecting circuit $f$ comprises latches $f_1$ and $f_2$ (the RCA IC CD 4042) and a magnitude comparator $f_3$ (the RCA IC CD 4063B), and the second displacement detecting circuit $g$ similarly comprises latches $g_1$ and $g_2$ and a magnitude comparator $g_3$. The first auxiliary circuit $h$ comprises NOR gates $h_1$, $h_7$ and $h_8$, inverters $h_2$, $h_4$ and $h_6$ and NAND gates $h_3$ and $h_5$, and the second auxiliary circuit $i$ similarly comprises NOR gates $i_1$, $i_7$ and $i_8$, inverters, $i_2$, $i_4$ and $i_6$ and NAND gates $i_3$ and $i_5$. The output binary code of the counter circuit $e$ is applied to the latch $f_1$ of the first displacement detecting circuit $f$ and the latch $g_1$ of the second displacement detecting circuit $g$. The signal produced by the NAND gate $b_5$ of the logical circuit $b$ as shown in (5) of FIG. 10 is applied to one input of each of the NOR gates $h_1$ and $i_1$, while the other input of the NOR gate $h_1$ receives the signal produced by the binary counter $r_1$ of the memory command circuit $r$ as shown in (12) of FIG. 10 and (830) of FIG. 8, respectively, and the other input of the NOR gate $i_1$ receives the inverted signal of the signal shown in (12) of FIG. 10. Since the signal shown in (12) of FIG. 10 remains at 0 during the time period $t_1$ to $t_2$, the inverted signal of the signal shown in (5) of FIG. 10 is produced at the output of the NOR gate $h_1$ as shown in (13) of FIG. 10 and this signal is further inverted by the inverter $h_4$ producing the signal shown in (14) of FIG. 10. This signal is then applied to the clock terminal C of the latch $f_1$ in the first displacement detecting circuit $f$, so that when the clock terminal C of the latch $f_1$ goes to 0, the signal states at its data terminals $D_1$, $D_2$, $D_3$ and $D_4$ are delivered to its output terminals $Q_1$, $Q_2$, $Q_3$ and $Q_4$. Consequently, the signals which arrive at the inputs $D_1$, $D_2$, $D_3$ and $D_4$ when the clock terminal C of the latch $f_1$ goes to 0 at a time $t_{11}$ are such that the inputs $D_1$, $D_2$ and $D_4$ respectively have 0 and the input has 1 as shown in (8), (9), (10), and (11) of FIG. 10. Thus, the outputs $Q_1$, $Q_2$ and $Q_4$ respectively have 0 and the output $Q_3$ has 1 correspondingly with the respective inputs. These output signals are respectively applied to the data terminals $D_1$, $D_2$, $D_3$ and $D_4$ of the latch $f_2$ and the inputs $B_0$, $B_1$, $B_2$ and $B_3$ of the magnitude comparator $f_3$. The magnitude comparator $f_3$ is connected to compare two data A and B to ascertain their relative magnitude so that when the relation between the data A and B is A<B its OUT terminal goes to 0, whereas the OUT terminal goes to 1 when A$\geq$B. The output signals of the latch $f_2$ are applied to the other inputs $A_0$, $A_1$, $A_2$ and $A_3$ of the magnitude comparator $f_3$. It is to be noted that the outputs of the latch $f_2$ have all been set to 0 by the initializing circuit $x$ at the time $t_1$. In other words, since the output code $2^0$, $2^1$, $2^2$, $2^3$ or 0, 0, 0, 0 of the latch $f_2$ are applied to the input group A ($A_0$ to $A_3$) of the magnitude comparator $f_3$ and the output code $2^0$, $2^1$, $2^2$ and $2^3$ or 0, 0, 1, 0 of the latch $f_1$ are applied to the other input group B ($B_0$ to $B_3$), there is a relation A<B and the OUT terminal of the magnitude comparator $f_3$ goes to 0 at the time $t_{11}$ as shown in (15) of FIG. 10. This 0 signal is applied to the NOR gate $h_8$ and the signal from the logical circuit $b$, shown in (6) of FIG. 10, is applied to the other input of the NOR gate $h_8$. Thus, when both of the input signals go to 0 at a time $t_{12}$, the output of the NOR gate $h_8$ goes to 1. This 1 signal is applied to the clock terminal C of the latch $f_2$ through the NOR gate $h_7$, the NAND gate $h_5$ and the inverter $h_6$. The signal applied to the clock terminal C is shown in (16) of FIG. 10. Consequently, the signal states existing at the data input terminals when the clock terminal goes to 0 are delivered to the outputs of the latch $f_2$. Namely, the signals having the same states as the output signals of the latch $f_1$ are produced. Consequently, the input groups A and B of the magnitude comparator $f_3$ receive the same binary code $2^0$, $2^1$, $2^2$, $2^3$ or 0, 0, 1, 0 and thus A = B. Then, when the output of the magnitude comparator $f_3$ goes to 1, a 1 signal is applied to the clock terminal C of the latch $f_2$ and the latch $f_2$ holds the code signal of the signal states 0, 0, 1, 0 until the next comparison operation is started. Thereafter, when the count reset signal shown in (4) of FIG. 10 goes to 1 at a time $t_{13}$, the counter circuit $e$ or the binary counter $e_1$ is reset to the initial state. Then, during the time period $T_{21}$ the counter circuit $e$ or the binary counter $e_1$ again counts the output signals of the brake sensor 1 and produces at its outputs $Q_2$, $Q_3$, $Q_4$ and $Q_5$ the signals respectively shown in (8), (9), (10), and (11) of FIG. 10. Thus, a similar operation as the above-mentioned operation during the time period $T_{11}$ takes place and the code signal of 1, 1, 1, 0 at a time $t_{21}$ is delivered to the outputs $Q_1$, $Q_2$, $Q_3$ and $Q_4$ of the latch $f_1$. In this case, at the time $t_{21}$, the outputs $Q_1$, $Q_2$, $Q_3$ and $Q_4$ of the latch $f_2$ have the same states as existed during the time period $T_{11}$, i.e., 0, 0, 1, 0. Consequently, the input groups A and B of the magnitude comparator $f_3$ become A<B, so that by a similar operation as mentioned in connection with the time period $T_{11}$, the outputs of the latch $f_2$ have a code signal of 1, 1, 1, 0 at a time $t_{22}$. Then, during the time period $T_{31}$, a similar operation as mentioned in connection with the time periods $T_{11}$ and $T_{21}$, respectively, takes place and thus the outputs of the latch $f_2$ changes at a time $t_{32}$ from their previous states of 1, 1, 1, 0 during the time period $T_{21}$ to 0, 1, 0, 1, respectively. Thus, the binary code corresponding to the pedal position is delivered from the outputs $Q_1$, $Q_2$, $Q_3$ and $Q_4$ of the latch $f_2$ and in this embodiment these signals states 0, 1, 0, 1 are assumed to represent the maximum displacement of the pedal while the brake system is functioning normally. Then, in the time period $T_{41}$ during which the pedal is released, as mentioned previously, the output code signal of the latch $f_1$ has 1, 1, 1, 0 and the output code signal of the latch $f_2$ has 0, 1, 0, 1, so that the relation between the input groups A and B of the magnitude comparator $f_3$ becomes A>B and the OUT terminal of the magnitude comparator $f_3$ does not change its state. Consequently, even if the outputs of the latch $f_1$ change from the signal states of the time period $T_{31}$ to the signal states of the time period $T_{41}$, the outputs of the latch $f_2$ remain in the signal states attained during the time period $T_{31}$. Also during the next time period $T_{51}$, the outputs of the latch $f_2$ remain in the signal states attained during the time period $T_{31}$.

The first and second memory circuits $j$ and $k$ respectively comprise latches $j_1$ and $k_1$, and the comparison circuit $l$ comprises a magnitude comparator $l_1$. The output signal 0, 1, 0, 1 (the signal corresponding to the maximum displacement by the first pedal movement) of the latch $f_2$ in the first displacement detecting circuit $f$ is applied to the data input terminals of the latch $j_1$. The first memory command signal shown in (840) of FIG. 8 which goes to 0 after the time $t_2$ at which the pedal is released, is applied to the clock terminal C of the latch $j_1$ from the memory command circuit $r$. Consequently, the outputs of the latch $j_1$ assume the data input states attained when the clock terminal C goes to 0, i.e., the signal states of 0, 1, 0, 1. On the other hand, the memory reset signal shown in (820) of FIG. 8 is applied to the clock terminal C of the latch $f_2$ from the NAND gate $v_7$ of the pedal movement indication circuit $v$, so that the outputs of the latch $j_1$ assume the same signal states assumed by the outputs of the latch $f_1$ in the time period $T_{51}$ during which the pedal is released, namely, they assume the signal states of 0, 0, 1, 0 and the first memory circuit $j$ is conditioned for the next pedal movement. Thus, the first memory circuit $j$ stores the position of the maximum displacement of the pedal by the first pedal movement. It is apparent that when the pedal is depressed at the time $t_4$ and released at the time $t_5$, the similar operation and results are obtained as during the abovementioned time period $t_1$ to $t_2$.

Next, the operation of the system during the time period $t_6$ to $t_7$ where the second pedal movement takes place, will be described. During the second pedal movement, the operations of the second displacement detecting circuit $g$, the second auxiliary circuit $i$ and the second memory circuit $k$ are the same with the previously described operations of the first displacement detecting circuit $f$, the first auxiliary circuit $h$ and the first memory circuit $j$ and thus they will not be described in detail. However, at the second pedal movement the NOR gate $i_1$ of the second auxiliary circuit $i$ is opened and the NOR gate $h_1$ of the first auxiliary circuit $h$ is closed, with the result that only the second displacement detecting circuit $g$, the second auxiliary circuit $i$ and the second memory circuit $k$ come into operation to detect and store the maximum displacement of the pedal by its second movement. It will be seen from the previous description that at the first movement of the pedal the NOR gate $i_1$ is closed and only the first displacement detecting circuit $f$, the first auxiliary circuit $h$ and the first memory circuit $j$ come into operation. Assuming now that there is an irregularity such as the inclusion of air in the brake system, the residual stroke at the second movement of the pedal increases as compared with that at the first pedal movement. In other words, the shaft 111 of the brake sensor 1 is displaced only to the position $X_1'$ shown in FIG. 5. Consequently, it is apparent that while the outputs of the latch $g_2$ of the second displacement detecting circuit $g$ change their signal states from 0, 0, 0, 0 to 1, 1, 1, 0 in a similar manner as the previously mentioned first pedal movement until the shaft 111 is displaced to the position $X_2$ in FIG. 5, when the shaft 111 is displaced only up to the position $X_1'$, as mentioned previously, the frequency of the output signals from the brake sensor 1 is decreased apparently as compared with that when the shaft 111 is displaced to the position $X_1$. Consequently, if the output code signal of the latch $g_1$ of the second displacement detecting circuit $g$ changes to 1, 0, 0, 1 at the position $X_1'$, the output code signal of the latch $g_2$ also goes to 1, 0, 0, 1. On the other hand, the clock terminal C of the latch $k_1$ of the second memory circuit $k$ receives the second memory command signal which goes to 0 after the time $t_7$ at which the pedal is released after the second pedal movement as shown in (841) of FIG. 8 and consequently the latch $k_1$ stores a code signal having the signal states of 1, 0, 0, 1 corresponding to the maximum displacement during the second movement of the pedal. Then, the stored values of the pedal displacements by the first and second movements, that is, the first movement code signal 0, 1, 0, 1 and the second movement code signal 1, 0, 0, 1 are respectively applied to the input groups B and A of the magnitude comparator $l_1$ in the comparison circuit $l$. Since these input values have a relation A<B, the OUT terminal of the magnitude comparator $l_1$ goes to 0. In other words, the comparison circuit *l* produces a 0 signal when there is any irregularity in the brake system.

The display circuit *m* comprises a D-type flip-flop $m_1$, a transistor $m_2$, a light emitting diode $m_3$ and a resistor $m_4$. The second movement signal shown in (850) of FIG. 8 is applied to the clock terminal C of the D-type flip-flop $m_1$ so that the D-type flip-flop $m_1$ delivers the 0 signal applied to its data input terminal D to its output Q when the applied second movement signal goes to 1. At this time, the inverted 1 signal is produced at the output $\overline{Q}$ so that the transistor $m_2$ is turned on and the light emitting diode $m_3$ is lighted. This lighting of the light emitting diode $m_3$ gives an indication that the residual stroke of the pedal at the second movement was different from that at the first movement. Thus, by installing the light emitting diode $m_3$ in front of the driver's seat of the vehicle, it is possible to warm the driver of any irregularities in the brake system. It is evident that when the residual stroke of the pedal at the second movement remains substantially the same as compared with that at the first movement, the stored value of the first memory circuit *j* becomes equal to that of the second memory circuit *k* so that the output of the comparison circuit *l* goes to 1 and the display circuit *m* is not operated.

Figure 11:
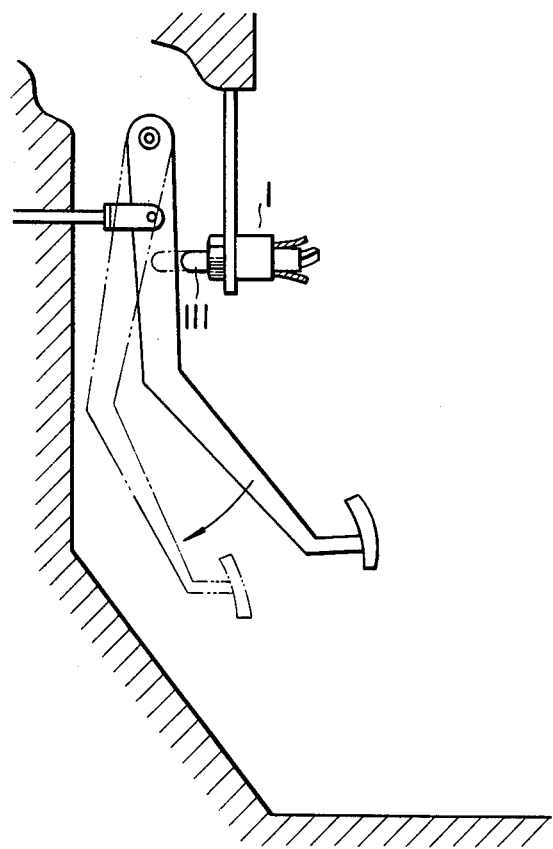
FIG. 11 is a schematic diagram showing an exemplary mounting position of the brake sensor relative to the brake pedal.

While, in the embodiment of the invention described above, the shaft 111 of the brake sensor 1 is operatively coupled to the brake pedal as shown in FIG. 11 so that the shaft 111 is extended from its housing in response to the depression of the brake pedal, the brake sensor 1 may be disposed so that the shaft 111 is withdrawn into the housing in response to the depression of the brake pedal. In short, it is only necessary that the oscillation frequency of the brake sensor 1 changes in response to the movement of the brake pedal.

We claim:

1. A brake checking system for a vehicle comprising:
   a. a brake sensor disposed to produce an output signal having a frequency corresponding to the displacement of a brake pedal of a vehicle;
   b. a detection circuit including first and second displacement detecting circuits connected to said brake sensor and responsive to the output signal of said brake sensor for respectively detecting a maximum displacement of said brake pedal during first and second movements thereof, respectively;
   c. a comparison circuit connected to said detection circuit for comparing the maximum displacements detected by said displacement detecting circuits to produce a signal corresponding to the difference between said maximum displacements; and
   d. a display circuit connected to said comparison circuit and responsive to the signal from said comparison circuit for indicating the occurrence of a difference between said maximum displacements.

2. A system according to claim 1, wherein said detection circuit further includes an operation control circuit for detecting the first and second movements of said brake pedal, whereby in response to each of said movements one or the other of said displacement detecting circuits is caused to perform a displacement detecting operation.

3. A system according to claim 2, wherein said operation control circuit includes a pedal movement detecting circuit for detecting only the second movement of said brake pedal made within a predetermined time period after the first movement of said brake pedal and producing an output signal, and a pedal movement instruction circuit connected to said pedal movement detecting circuit for responding to the output signal thereof to bring said second displacement detecting circuit into operation in place of said first displacement detecting circuit.

4. A system according to claim 3, wherein said operation control circuit further includes a display control circuit responsive to the output signal of said pedal movement detecting circuit for displaying the occurrence of the second movement of said brake pedal within said predetermined time period.

5. A system according to claim 1, wherein said brake sensor comprises mechanical means disposed for displacement in response to the displacement of said brake pedal, and electric means disposed to convert the displacement of said mechanical means into a variation of electric signal frequency.

6. A system according to claim 5, wherein said mechanical means includes a shaft connected to said brake pedal to respond to the movement thereof, and wherein said electric means includes an LC oscillator circuit having a spring coil for converting the displacement of said shaft into an inductance variation.

7. A brake checking system for a vehicle comprising:
   a. a brake sensor disposed to produce an output signal having a frequency corresponding to the displacement of a brake pedal of a vehicle;
   b. a first displacement detecting circuit and a second displacement detecting circuit connected to said brake sensor to respond to the output signal thereof for respectively detecting a maximum displacement of said brake pedal during first and second movements thereof, respectively;
   c. an operation control circuit connected to said brake sensor and said first and second displacement detecting circuits, whereby the first movement of said brake pedal is detected to operate said first displacement detecting circuit, and only the second movement of said brake pedal made within a predetermined time period after said first movement is detected to operate said second displacement detecting circuit in place of said first displacement detecting circuit; and
   d. a comparison circuit connected to said first and second displacement detecting circuits for comparing the maximum displacements detected by said displacement detecting circuits to produce an output signal corresponding to the difference between said maximum displacements and indicative of a brake system irregularity.

8. A system according to claim 7, wherein said brake sensor comprises mechanical means disposed for displacement in response to the displacement of said brake pedal, and electric means disposed to convert the displacement of said mechanical means into a variation of electric signal frequency.

9. A system according to claim 8, wherein said mechanical means include a shaft coupled to said brake pedal to respond to the movement thereof, and wherein said electric means includes an LC oscillator circuit having a spring coil for converting the displacement of said shaft into an inductance variation.

* * * * *